July 28, 1959  M. S. BANN ET AL  2,897,439
MAGNETOSTRICTIVE RESONANT-DISC TEST JIG
Filed April 1, 1957  3 Sheets-Sheet 1

INVENTORS
MICHAEL S. BANN
HERBERT O. LEWIS
BY Moody and Goldman
ATTORNEYS

July 28, 1959   M. S. BANN ET AL   2,897,439
MAGNETOSTRICTIVE RESONANT-DISC TEST JIG
Filed April 1, 1957   3 Sheets-Sheet 2

INVENTORS
MICHAEL S. BANN
HERBERT O. LEWIS
BY Moody and Goldman

ATTORNEYS

July 28, 1959 M. S. BANN ET AL 2,897,439
MAGNETOSTRICTIVE RESONANT-DISC TEST JIG
Filed April 1, 1957 3 Sheets-Sheet 3

INVENTORS
MICHAEL S. BANN
HERBERT O. LEWIS
BY *moody and Goldman*

ATTORNEYS

United States Patent Office
2,897,439
Patented July 28, 1959

2,897,439

MAGNETOSTRICTIVE RESONANT-DISC TEST JIG

Michael S. Bann, Pacoima, and Herbert O. Lewis, Canoga Park, Calif., assignors to Collins Radio Company, Cedar Rapids, Iowa, a corporation of Iowa Application April 1, 1957, Serial No. 649,839

4 Claims. (Cl. 324—34)

This invention relates to apparatus for testing the frequency response of magnetostrictive discs.

Cylindrical discs of magnetostrictive material are used in the manufacture of mechanical filters of the type described and claimed in Patent No. 2,615,981, titled "Electromechanical Filter," and Patent No. 2,717,361, titled "Mechanical Filter," both to Melvin L. Doelz. The discs in such filters must be tuned precisely to a given frequency. Often, all of the discs used in a filter are tuned to the same frequency with band-pass requirements determined by the diameter of coupling wires. In other cases, the discs are tuned to different frequencies to give varying types of frequency responses. In any case, it is essential that discs used in the construction of such filters be tuned to precise given frequencies.

This invention provides convenient means for measuring the frequency response of magnetostrictive discs and excites each disc in a symmetrical mode, that is used in parallel-disc mechanical filters. The invention permits rapid alignment of a filter disc between a pair of coils received on opposite sides of the disc with an initial magnetizing surge automatically provided upon insertion of the disc. An oscillatory electromagnetic field is then provided that symmetrically excites the disc. One coil excites the disc by magnetostrictive action, and the other coil has an electromotive force induced in it by inverse magnetostrictive action of the disc. Shielding housings of non-permeable conducting material are provided about the coils to prevent stray flux from by-passing the disc. The invention permits a vise arrangement wherein discs of various thicknesses can be tested.

Further objects, features and advantages of this invention will be apparent to a person skilled in the art upon further study of the specification and drawings, in which.

Figure 1:
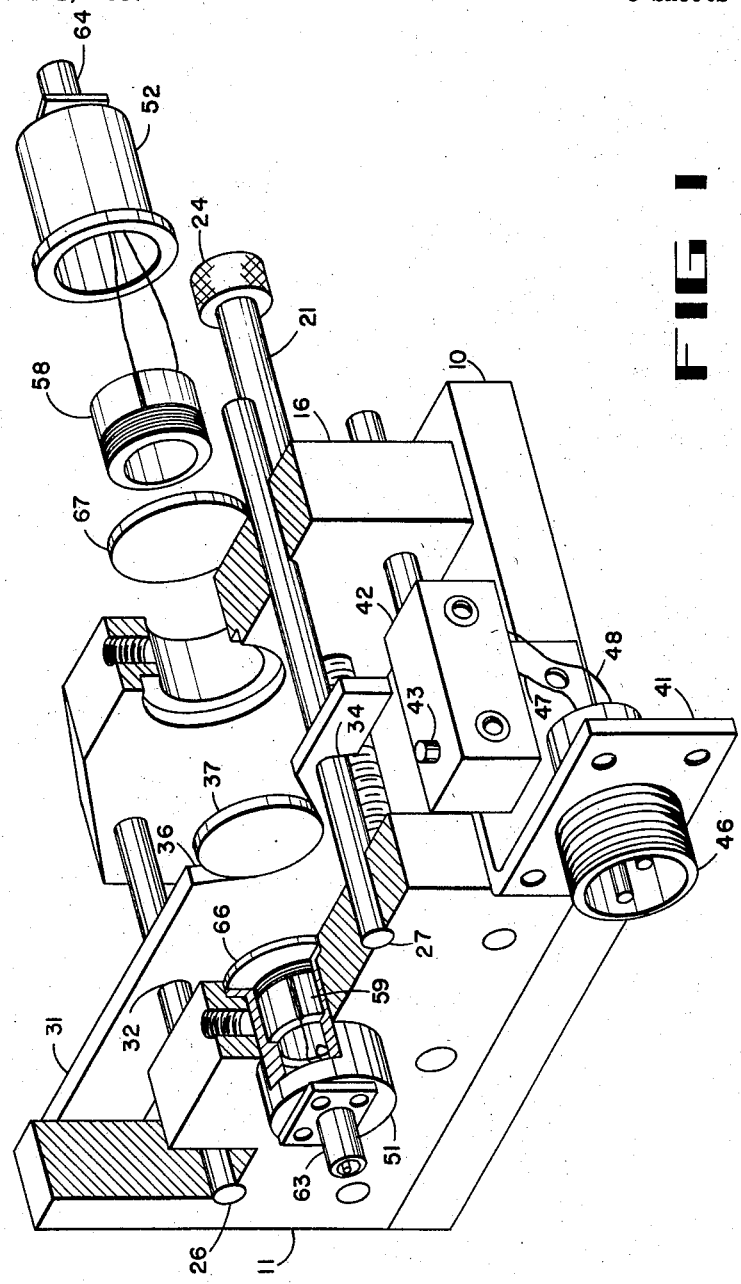
Figure 1 is a partial isometric view having exploded portions.
Figure 2:
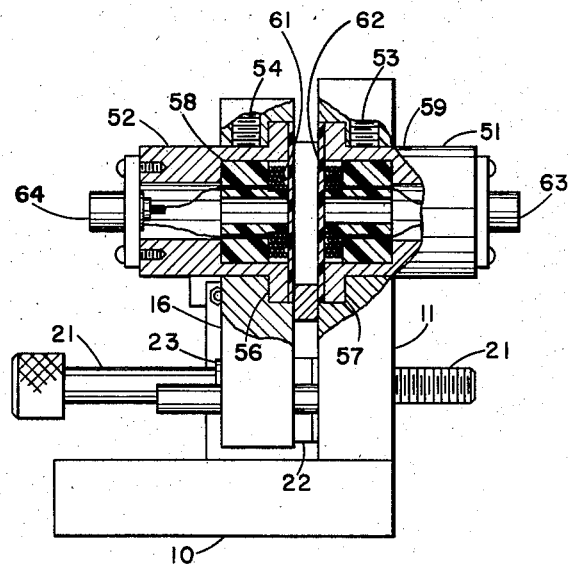
Figure 2 is a partially-sectioned side-elevational view of the invention.
Figure 3:
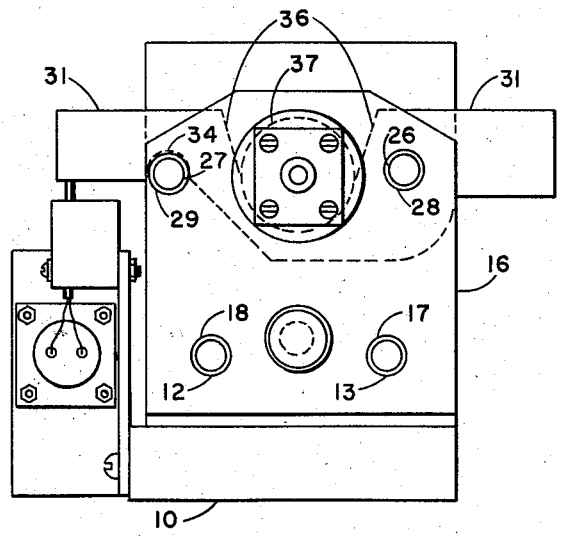
Figure 3 is a front elevational view.

Now referring to the invention in more detail, Figure 1 illustrates it with an isometric view, which is partially exploded and which is partially sectioned for clarity. It includes a base 10 and a back member 11 fixed uprightly along one edge of the base 10. A pair of pins 12 and 13 are fixed to back member 11 and extend parallel to each other and to base 10. An adjustable support 16 is formed with a pair of openings 17 and 18, shown in Figure 3, that slideably receive pins 12 and 13, respectively. An adjustment screw 21 having a knurled knob 24 is received slideably through adjustable support 16, but has a shoulder 23 that engages adjustable support 16 on its outer side. Screw 21 is received threadedly through back member 11. A leaf spring 22 (shown in Figure 2) is positioned between back member 11 and adjustable support 16 to bias them apart, whereby adjustable support 16 is forced against shoulder 23.

Thus, adjustable support 16 maintains spring 22 in a conventional vise arrangement by means of the support pins and adjustment screw.

Furthermore, a pivoting rod 26 and a stop rod 27 are each fixed at one end to back member 11. Adjustable support 16 also has openings 28 and 29 that slideably receive both of these rods, which further provide support for adjustable support 16.

A disc holder 31 has an opening 32 formed through it which receives pivoting rod 26. The other side of disc holder 31 is formed with a notch 34. Disc holder 31 is pivotable about rod 26, but its pivoting movement is limited in the downward direction in Figure 1 when notch 34 engages stop rod 27. Holder 31 is formed centrally with a V-shaped groove 36 that is rounded on its bottom to receive a magnetostrictive disc 37, which is the work-piece of the jig.

An L-shaped bracket 41 is fixed to the edges of base 10 and back member 11. A surge initiating switch 42 is fastened to bracket 41 and has a plunger-actuating pin 43 extending upwardly in Figure 1. Switch 42 is of the normally-open momentary type, wherein it is closed only during the period that pin 43 is depressed, but is self-opening when pressure is removed from pin 43.

A connector 46 is also supported by bracket 41, and a pair of leads 47 and 48 serially connect the contacts of switch 42 to the respective output terminals of connector 46. Connector 46 is connectable to a transient direct-current source (not shown).

A pair of shielding housings 51 and 52 are received and supported in respective openings through back member 11 and adjustable support 16, and are fixed therein by a pair of set screws 53 and 54. The shielding housings are made of non-permeable conducting material such as brass, and each is formed with a flared end 56 or 57, which is countersunk into the inner surfaces of back member 11 or adjustable support 16, respectively. Coil forms 58 and 59 are respectively received within shielding housings 51 and 52.

Each coil 61 or 62 is positioned near the end of its coil form 58 or 59, with its leads received through grooves cut in the coil form. A pair of coaxial connectors 63 and 64 are respectively fixed to the outer ends of shielding housings 51 and 52. They connect to the leads of their respective coils. Connectors 63 and 64 provide the signal terminals for the jig.

A coil cover 66 or 67 is mounted over the end of each shielding housing facing the magnetostrictive disc; and coils 61 and 62 are adjacent the respective coil covers. However, the flared ends of the housings and the coil covers have a larger diameter than the disc being tested. Coil cover 66 is flush with the inner surface of back member 11; and the other coil cover 67 is flush with the inner surface of adjustable support 16. The coil covers are made of insulating material, and they are constructed with a thickness that is as small as the structural rigidity of its material permits, such as 1/64 of an inch. Its thickness is not critical.

The spacing between back member 11 and adjustable support 16 is determined by the thickness of the magnetostrictive discs to be tested. The spacing provides sufficient clearance to enable the discs to be easily injected and ejected by the pivoting movement of disc holder 31.

When a disc is placed in the jig, notch 34 of disc holder 31 is received against stop rod 27, where the disc holder engages actuating pin 43 to close the contacts of surge switch 42.

Figure 4:
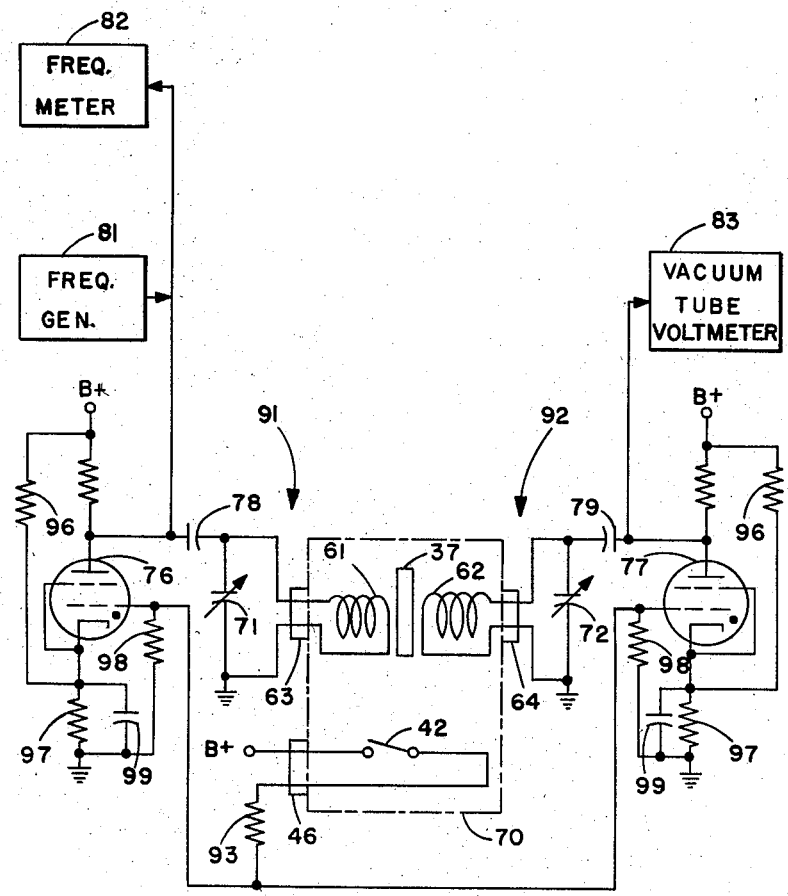
Figure 4 is a block diagram of a circuit in which the invention can be used.

Fig. 4 shows a circuit in which the invention can be used. However, other circuits can also use the invention such as that in the Patent Application No. 644,838 filed March 8, 1957 and titled "Magnetostrictive Disc Test Oscillator" by Herbert O. Lewis. Block 70 in Figure 4 schematically represents the invention, with disc 37 received between coils 61 and 62. Surge switch 42 is connected to a B plus supply through a resistor 93 and one terminal of connector 46. A pair of adjustable capacitors 71 and 72 are connected respectively across coils 61 and 62 through connectors 63 and 64, respectively. Each adjustable capacitor has an end connected to ground.

The other side of surge switch 42 is connected to the other terminal of connector 46, which is connected to the grids of a pair of gas discharge tubes 76 and 77. A first discharge capacitor 78 is connected between the plate of discharge tube 76 and the ungrounded side of adjustable capacitor 71. Similarly, a second discharge capacitor 79 is connected between the plate of the other discharge tube 77 and the ungrounded side of second adjustable capacitor 72. Each gas tube has its cathode biased below cut-off by a voltage divider comprising resistors 96 and 97, because the control grids are normally maintained at ground potential by grid leak resistors 98.

The thyratron cathodes are maintained at fixed positive potentials by the associated voltage dividers and by-pass capacitors 99. The plates are normally maintained at B plus potential by the associated charging resistors. Capacitors 78 and 79 are thus normally charged to B plus potential. The control grids of the thyratrons are normally maintained at ground potential by the grid return resistors. The thyratrons are thus maintained in a non-conducting state by virtue of the cathode bias.

Thus, when a magnetostrictive disc is initially placed into the invention, switch 42 is closed; and a large transient direct-current surge is provided through coils 61 and 62 by the firing of discharge tubes 76 and 77 through their respective discharge capacitors.

At the instant switch 42 is closed the grids are brought to a potential more positive than the cathodes, causing the tubes to conduct. The plate voltages immediately descend to approximately the cathode potentials, placing a voltage across coils 61 and 62, which is slightly less than the B plus potential. Capacitors 78 and 79 then discharge through coils 61 and 62 for a period of about one millisecond, magnetizing the surfaces of the disc. When the plate currents reach some very low value the tubes become non-conductive, at which time, capacitors 78 and 79 begin to recharge to B plus potential.

The current surges through the respective coils cause a permanent magnetization of the magnetostrictive material on opposite surfaces of the disc. This permanent magnetization enables proper magnetostrictive transducing without additional permanent magnets and without additional windings that receive direct-current to provide a D.C. flux.

A frequency generator 81 and frequency meter 82 are connected to the ungrounded side of variable capacitor 71, and a vacuum-tube voltmeter 83 is connected to the ungrounded side of second variable capacitor 72.

Capacitors 71 and 72 are adjusted so that they parallel resonate with coils 61 and 62, respectively, at nearly the frequency of the magnetostrictive discs to be tested. These parallel-resonant circuits, 91 and 92, however, are broadband and have nearly a flat response over that portion of the spectrum where the active response of any disc 37 exists.

The frequency generator is swept through a frequency range that includes the main frequency response of the disc being tested, and the response is noted by means of the vacuum-tube voltmeter 83.

Of course, spectrum analyzers utilizing cathode ray tubes or recording devices may be utilized instead of frequency generator 81, meter 82 and vacuum-tube voltmeter 83, as will be apparent to one skilled in the art after studying this specification.

Although this invention has been described with respect to a particular embodiment thereof, it is not to be so limited as changes and modifications may be made therein which are within the full intended scope of the invention as defined by the appended claims.

We claim:
1. Apparatus for testing the resonant frequency of a magnetostrictive cylindrical disc comprising a base member, a pair of upright members supported on said base, said upright members having inner surfaces parallel to each other, a pair of housings made of non-permeable conducting material received through said upright members respectively, said housings being axially aligned, a pair of cover members provided over the ends of said housings flush with the respective inner surfaces of said upright supports, a pair of coils respectively received in said housings adjacent to the respective housing covers, said coils being axially aligned, a disc support formed with a V-shaped groove, a pivoting rod received between said upright members, said disc support pivotable on said pivoting rod, and a stop rod received between said upright supports, with said disc support supporting said magnetostrictive disc in its V-shaped groove in axial alignment with said coils with said disc support engaging said stop rod.

2. Apparatus as defined in claim 1 having a pair of variable capacitors respectively connected across said coils to form respective parallel-resonant circuits tuned to a frequency near the resonant frequency of said magnetostrictive disc.

3. Apparatus as defined in claim 2 having a momentary switch being supported on said base, a direct-voltage source connected to one end of said switch, said switch being closed by engagement by said disc support with said magnetostrictive disc in test position, a pair of gas discharge tubes, and a pair of discharge capacitors, and said gas discharge tubes and said discharge capacitors being connected respectively in series between said parallel-resonant circuits and the other side of said surge switch.

4. Apparatus for testing a magnetostrictive cylindrical disc comprising a base, a back member fixed uprightly to said base, an adjustable upright member, a pair of pins fixed to said back member and slideably received through openings in said adjustable member to support it with respect to said base, an adjustment screw received through said back member and adjustable support to enable adjustment of the spacing between them, a pair of cylindrical housings made of non-permeable conducting material, one of said housings received through said back member, the other of said housings received through said adjustable member in axial alignment with said one housing, a pair of coil forms received in said housings respectively, a pair of coils wound about said coil forms respectively, a pair of coil covers respectively received over the ends of said housings flush with the inner surface of said back member and adjustable support respectively, respective coils provided on said coil forms near the inner ends of said housings, a pivoting pin and a stop pin received on opposite sides of said housings between said back member and adjustable member, a disc support formed with a V-shaped groove and pivotably supported on one side of its groove by said pivoting rod, the pivoting movement of said disc support being limited by said stop rod, the magnetostrictive disc receivable in said groove for being aligned axially with said coils when said disc support engages said stop rod, a switch being supported with respect to said base, and an actuating member being provided with said switch and being engageable with said disc support as it engages said stop rod.

References Cited in the file of this patent
UNITED STATES PATENTS

| | | |
|---|---|---|
| 2,234,456 | Schaurte et al. | Mar. 11, 1941 |
| 2,334,393 | Dillon | Nov. 16, 1943 |
| 2,537,753 | Hansen | Jan. 9, 1951 |
| 2,574,795 | Miller | Nov. 13, 1951 |
| 2,587,664 | Stout | Mar. 4, 1952 |
| 2,642,482 | Segsworth | June 16, 1953 |